United States Patent
Gould et al.

(10) Patent No.: US 9,072,385 B2
(45) Date of Patent: Jul. 7, 2015

(54) PORTABLE PACKABLE REUSABLE STORAGE DEVICE

(75) Inventors: Seth Gould, Bloomfield Township, MI (US); Andrew Rifkin, Birmingham, MI (US)

(73) Assignee: In The Booth LLC, Bloomfield Township, MI (US)

( * ) Notice: Subject to any disclaimer, the term of this patent is extended or adjusted under 35 U.S.C. 154(b) by 259 days.

(21) Appl. No.: 13/561,137

(22) Filed: Jul. 30, 2012

(65) Prior Publication Data

US 2013/0193724 A1 Aug. 1, 2013

Related U.S. Application Data

(60) Provisional application No. 61/512,667, filed on Jul. 28, 2011, provisional application No. 61/623,839, filed on Apr. 13, 2012.

(51) Int. Cl.

| | |
|---|---|
| *A47C 7/62* | (2006.01) |
| *A45C 15/00* | (2006.01) |
| *A47C 7/70* | (2006.01) |
| *A45C 9/00* | (2006.01) |
| *A45F 3/00* | (2006.01) |
| *B60R 7/04* | (2006.01) |

(52) U.S. Cl.
CPC ... *A47C 7/62* (2013.01); *A45C 9/00* (2013.01); *A45F 3/00* (2013.01); *A45C 15/00* (2013.01); *B60R 7/043* (2013.01); *A47C 7/70* (2013.01)

(58) Field of Classification Search
USPC ............... 297/188.12, 188.2, 188.21, 188.13, 297/256.16, 252, 228.12, 219.1
See application file for complete search history.

(56) References Cited

U.S. PATENT DOCUMENTS

| | | | |
|---|---|---|---|
| 1,869,071 A | | 7/1932 | McLean |
| 2,865,433 A | * | 12/1958 | Warner ........................... 383/25 |
| D222,315 S | | 10/1971 | Abraham |
| 4,556,250 A | | 12/1985 | Chapman et al. |
| 4,799,731 A | | 1/1989 | Brown |
| 4,836,369 A | | 6/1989 | Pickering |
| D357,609 S | * | 4/1995 | Webb et al. ..................... D6/596 |

(Continued)

OTHER PUBLICATIONS

The Messenger 10 rePETE™ sold by chico bag at: www.chicobag.com/category/messenger10-repete copyright 2012, last accessed on Mar. 23, 2012.

(Continued)

*Primary Examiner* — David E Allred
(74) *Attorney, Agent, or Firm* — The Dobrusin Law Firm, P.C.

(57) ABSTRACT

A portable packable reusable storage device for attachment to a support structure comprising: an article holding portion; a suspension portion connected with the article holding portion for removably attaching the storage device to the support structure; wherein the device is configured to include a deployed state that includes a deployed state volume for containing articles and the device collapses and packs into a packed state and includes a packed state volume that is about 50 percent or less (e.g. about 40 percent or less, about 30 percent or less, preferably about 20 percent or less, or more preferably about 10 percent or less) of the deployed state volume (e.g., volume as discussed herein is the amount of a fluid that the container can hold rather than the amount of space the container itself displaces); and wherein the suspension portion includes ends that form connection so that the storage device attaches to the support structure.

19 Claims, 5 Drawing Sheets

(56) References Cited

U.S. PATENT DOCUMENTS

| | | | |
|---|---|---|---|
| 5,409,291 A * | 4/1995 | Lamb et al. | 297/129 |
| 5,421,637 A | 6/1995 | Lemburg | |
| 5,490,712 A | 2/1996 | Drelick | |
| 5,573,288 A | 11/1996 | Raffensperger | |
| D386,904 S | 12/1997 | Bradshaw | |
| 5,816,463 A | 10/1998 | Echeverri | |
| D413,733 S | 9/1999 | Edmonds | |
| 5,988,465 A * | 11/1999 | Vitale et al. | 224/155 |
| 6,053,570 A | 4/2000 | Stern et al. | |
| 6,082,816 A | 7/2000 | Gottlieb et al. | |
| 6,102,569 A | 8/2000 | Wang | |
| 6,216,927 B1 * | 4/2001 | Meritt | 224/275 |
| D442,809 S | 5/2001 | de Windt et al. | |
| 6,474,524 B1 | 11/2002 | Ivarson | |
| 6,626,491 B1 * | 9/2003 | Blome et al. | 297/229 |
| 6,783,175 B1 * | 8/2004 | Henderson | 297/4 |
| 7,128,369 B2 | 10/2006 | Boggs et al. | |
| 7,614,689 B2 * | 11/2009 | Fowler et al. | 297/188.06 |
| 7,802,845 B2 * | 9/2010 | Kelleher | 297/252 |
| 8,070,225 B2 * | 12/2011 | Machabee | 297/219.12 |
| D675,019 S | 1/2013 | Jacobson | |
| 2008/0302840 A1 | 12/2008 | Missick | |
| 2013/0207423 A1 * | 8/2013 | Russell et al. | 297/188.2 |

OTHER PUBLICATIONS

Related Patent Application, U.S. Appl. No. 29/441,628, filed Jan. 8, 2013.

* cited by examiner

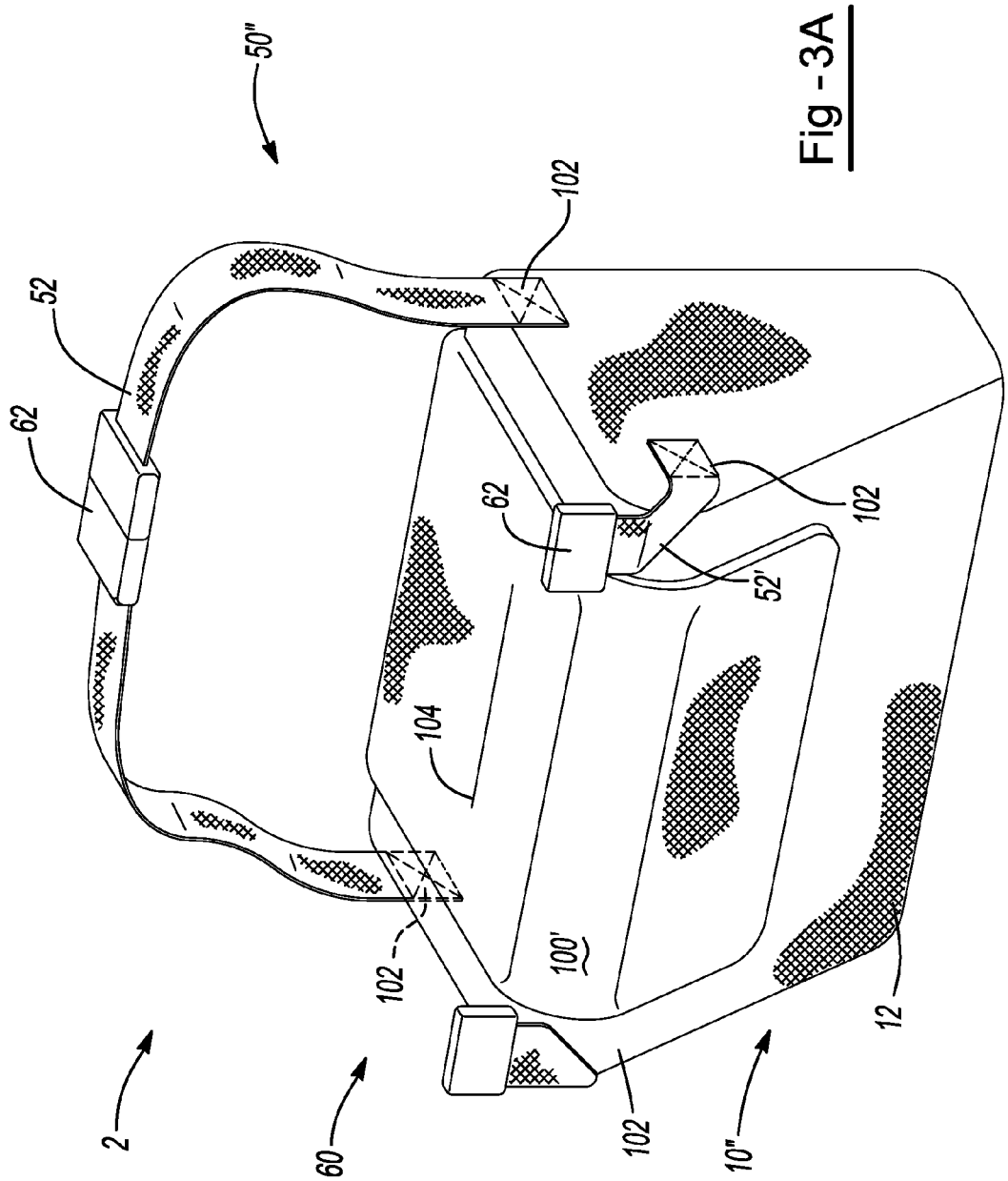

PORTABLE PACKABLE REUSABLE STORAGE DEVICE

CLAIM OF PRIORITY

The present teachings are related to U.S. Provisional Application Ser. No. 61/512,667 filed Jul. 28, 2011, and U.S. Provisional Application Ser. No. 61/623,839 filed Apr. 13, 2012, the contents of which are incorporated by reference herein.

FIELD

The present teachings generally relate to a portable packable reusable storage device and more specifically a storage device for attachment to a support structure such as seat.

BACKGROUND

Typical storage systems include a storage container that is permanently affixed to a device such as a seat, cushion, portable chair, or the like. These storage containers are not generally compressible or collapsible into a relatively small volume because they include a rigid portion for maintaining the shape of the storage container and/or the device that the storage system is permanently attached. The storage devices, when not permanently attached to a seat, cushion, or portable chair, may include internal structures so that the storage system is usable as a bag or backpack. Examples of such storage systems are disclosed in U.S. Pat. Nos. D413733; 4,556,250; 5,421,637; 5,490,712, 5,673,288; 5,816,463; 6,053,570; and 6,082,816; U.S. Patent Application Publication No. 2008/0302840. Other collapsible systems, such as the Messenger 10 rePETE™ sold by Chicobag at www.chicobag.com/category/messenger10-repete, last accessed Mar. 23, 2012, are not designed to be secured above the ground and out of the way in a stadium or event environment, or to be affixed to a device such as a seat, a cushion, a permanent or portable chair/seat/bench, or the like. All of these examples are expressly incorporated herein by reference for all purposes.

More recently, however, events that draw large crowds have been increasing security measures, and these increased security measures—along with limited space available to each person in attendance—have restricted the type, size, and volume of items that patrons are allowed to bring into the events. Due to these increases in security and decreases in space available to each person attending such events, fewer and fewer items that are used to store items are permitted into the events. One such example is a sporting event, such as a football game or other game in an arena or stadium, where security is attempting to limit patrons from entering the stadium with items such as weapons, alcohol, items which may be thrown, umbrellas, food, horns, whistles, glass items, or the like. Thus, backpacks, handbags, shoulder bags, foldable seating, seat covers, cases, or other such device are not permitted due to space and security concerns. Thus, patrons do not have any place to store their items and are left to either hold them or place them on the ground where they will likely become dirty, broken, lost, or forgotten. They may also be knocked over or contacted by other fans.

It would be attractive to have a portable, packable, and reusable storage device that fits into a pocket of the user so that the user is permitted to bring the device into the event and store items purchased at the event, worn to the event, or carried into the event. What is needed is a packable storage device that, when in a deployed state, maintains the articles above the ground and out of the way, so that the articles to do not get dirty, wet, kicked, tripped over, stuck in gum, moved, lost, stolen, the like, or a combination thereof. What is further needed is a storage device that is adjustable so that the storage device can pretty much universally conform to any of a variety of the different support structured found where there is public seating e.g. a support structure that has free space below the support or a support structure which has another structure under a large portion of the support structure (e.g. about 40 to 76 percent of the support structure includes a structure under the support structure) so that the storage device does not interfere with the walking path in front of the support structure.

SUMMARY

The teachings herein surprisingly solve one or more of these problems by providing a storage device that is portable, packable, and reusable, and which stores items out of the way, without intruding into the user's or others' personal spaces events.

The present teachings solve one or more of the problems by providing a device that is highly compactable. Desirably it is essentially also free of rigid structural members that inhibit or prevent compaction. The device of the present teachings can be compacted to a packed state volume that is about 25 percent or less, about 20 percent or less, about 15 percent or less, or even about 10 percent or less then the deployed state volume. The device of the present teachings is adjustable so that the device may be used with virtually any support structure without impeding people from walking in front of the support structure and so that the device is elevated above the ground so that the articles in the device remain dry and clean. The device of the present teachings, in a deployed state, is large enough so that the device holds multiple articles such as a coat, jacket, sweatshirt, food, beverages, magazines, or a combination thereof. In its compressed and compacted or packed state it is small enough to fit in a pocket, or other small space in the user's clothing.

One possible embodiment of the present teachings include: a portable, packable, and reusable storage device for attachment to a support structure comprising: an article holding portion; a suspension portion connected with the article holding portion for removably attaching the storage device to the support structure; wherein the device is configured to include a deployed state that includes a deployed state volume for containing articles and the device collapses and packs into packed state and includes a packed state volume that is about 50 percent or less (e.g. about 40 percent or less, about 30 percent or less, preferably about 20 percent or less, or more preferably about 10 percent less) of the deployed state volume (e.g., volume as discussed herein is the amount of a fluid that the container can hold rather than the amount of space the container itself displaces); and wherein the suspension portion includes ends that form connection so that the storage device attaches to the support structure.

One unique aspect of the present teachings envisions: a storage device comprising: a article holder portion, the article holder portion comprising: a front wall; a rear wall; a middle wall; a first side wall connected to a first side of the front wall, the rear wall, and the middle wall; a second side wall connected to a second side of the front wall, the rear wall, and the middle wall so that the first wall and the second wall are opposite each other and form the article holder portion; and a bottom wall connected to the front wall, the rear wall, the middle wall, the first side wall, and the second side wall so that when contents are placed in the article holder portion the contents are held in the article holder portion; a cover extending over at least the article holder portion; a side holder, the side holder comprising: a front wall, a rear wall, a first side wall connected to the front wall and the rear wall; second side wall connected to the front wall and the rear wall so that the first side wall and the second side wall are on opposite sides of the front wall and the rear wall; and a bottom wall connected to the front wall, the rear wall, the first side wall, and the second side wall forming the side holder so that contents are held in the storage device; a suspension portion, the suspension portion comprising: a strap attached to the article holder portion, the strap being attached to the first side wall or the front wall at a location proximate to the first side wall, and the strap being attached to the second side wall or the rear at a location proximate to the second side wall; a fastener at a point along the strap so that the strap can be separated into two sections; and two additional straps including a fastener attached to the front wall of the storage device so that when the strap is separated into two sections the straps connect to the two additional straps and the storage device is connected to a support structure; wherein the storage device includes a side holder on the first side wall and the second side wall of the article holder portion and the article holder portion and the side holders share a common wall; and wherein the storage device when not in use compacts into a package that is about 800 cm$^3$ or less.

The yet another possible teaching includes a: method of using the storage device taught herein comprising: wrapping the device around all or a portion of a support structure or a seat so that the container sits below the support structure or the seat so that articles are suspended without interfering with a walking path.

BRIEF DESCRIPTION OF THE DRAWINGS

FIG. 3A illustrates an example of a storage device in one possible carrying state;

DETAILED DESCRIPTION

Figure 1:
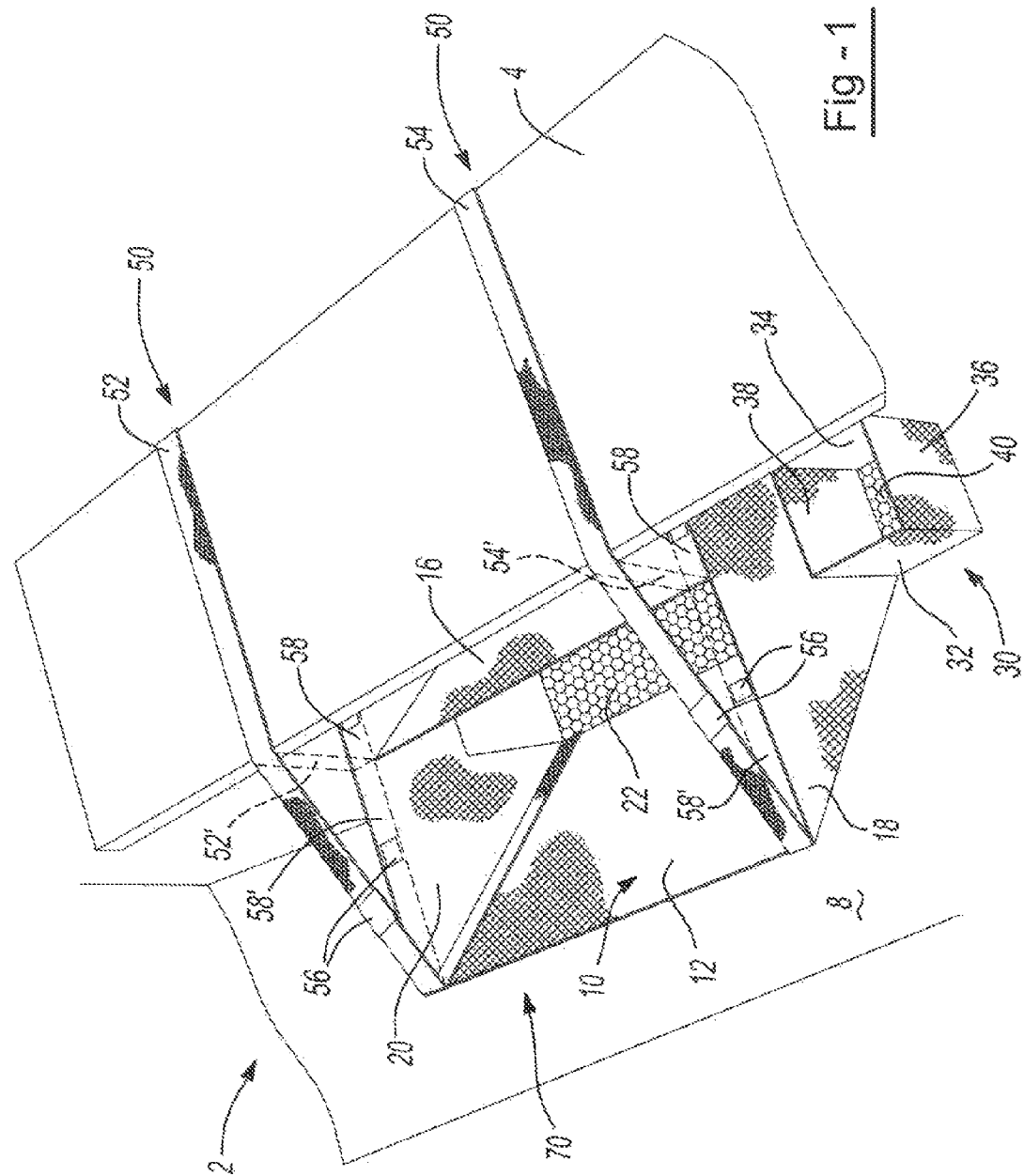
FIG. 1 illustrates an example of a storage device of the teachings herein in a deployed state.

The following description of the preferred embodiment(s) is merely exemplary in nature and is in no way intended to limit the teachings, its application, or uses.

The present invention is predicated upon providing an improved article holder portion for suspended attachment to a support structure in the space available behind a person's legs and/or under his or her support structure. The support structure may be a seat, bench, chair, bleacher, sitting device that has or is free of a back; a combination thereof or the like. The storage device may sit generally below the support structure. A majority of the storage device may sit under the support structure. The storage device may sit about 50 percent or more, preferably about 75 percent or more, more preferably about 85 percent or more, or most preferably about 95 percent or more below the support structure with a retracted or un-retracted front wall and/or middle wall as discussed herein. The storage device may be made of any material so that the device can be used to hold articles.

The storage device may be made of one layer. The storage device may include a dual layer. The dual layers may have an access port so that items may be stored between the layers. The storage device may be made of a woven or non-woven, synthetic, natural, post-consumer recycled, virgin, or a combination thereof textile. The storage device may be made of a combination of different materials. All or a portion of the storage device may be made of any material useful to hold items in a suspended portion and preferably a tear resistant material (e.g. polyamide, polypropylene, rayon polyester, polyethylene, polyethylene terephthalate, or a combination thereof). All or a portion of the device may be made of and/or include elastane, spandex, lycra, a polyurethane-polyurea copolymer, or a combination thereof. An example of one fabric that may be used is a polyamide, such as an aliphatic polyamide (e.g. Nylon 6, 6). It may be a ripstop material. The material may have a weave selected from one or more of a plain weave, a twill, basket, satin ripstop, or otherwise. The material may have a weight of about 100 g/m$^2$ or more, about 150 g/m$^2$ or more, about 200 g/m$^2$ or more, about 300 g/m$^2$ or more, about 400 g/m$^2$ or more, or even about 500 g/m$^2$ or more. The material may have a weight of about 700 g/m$^2$ or less, about 650 g/m$^2$ or less, or even 600 g/m$^2$ or less. The material may have a filling thread count of about 70 cm or more, about 100 cm or more, 150 cm or more, about 200 cm or more, or about 250 or more. The material may have a filing thread count of about 500 or less, about 400 or less, or about 300 or less. The material may have a warp tensile strength and/or filling tensile strength of about 45 kg or more, about 100 kg or more, about 200 kg or more, about 300 kg or more, about 400 kg or more, or even about 450 kg or more. The material may have a warp tensile strength and/or filling tensile strength of about 700 kg or less, about 600 kg or less, about 500 kg or less. It may be treated for increasing hydrophobicity. It may have a coating on it. It may be uncoated. The material of the storage device may be customized. For example, the material may be screen printed, embroidered, painted, bedazzled, customized, or a combination thereof.

The article holder portion includes a front wall and a rear wall. The front wall may form an angle relative to the rear wall so that the front wall angles away from the rear wall. The front wall, and optionally the middle wall when present may, form an angle with the rear wall, or a plane of the rear wall of between about 15 degrees and about 75 degrees with the rear wall, between about 25 and about 60, and between about 35 and about 55, and preferably between about 40 and 50 degrees. The front wall and the rear wall may be general parallel. The article holder portion may include a middle wall. The middle wall may form the same angle as the front wall, the rear wall, or both. The storage device may be free of a middle wall.

The article holder portion may include a first side wall, which is connected to a first side of: the front wall and the rear wall for forming a first side of the article holding portion. The first side wall may connect a middle wall, to the front wall, the back wall, or a combination thereof for forming a first side of the article holding portion. The article holding portion includes a second side wall connected to a second side of the front wall and the rear wall. The article holding portion may include a middle wall between the front wall and the back wall and attached to a second side wall for forming a second side of the article holding portion. The first side wall and the second side wall are opposite each other. The article holder portion includes a bottom wall so that the contents are held in the container. The bottom wall attaches to the front wall, rear wall, first side wall, and the second side wall. The bottom wall may attach to the middle wall. The article holder portion is generally top opening. The article holder portion generally sits directly below a support structure. The article holder portion may be open, covered, movably covered, or a combination thereof.

Preferably, the article holder portion includes a cover. The cover may be any size and shape so that the cover prevents unwanted materials from entering the article holder portion, a side holder, or both. The cover may attach to and/or be an extension of the rear wall. The cover may be one or more plies thick. Preferably, the cover is at least two plies of material thick. For example, one ply of material may be transparent or have transparent portions so that all or a portion of the second ply is visible so that a pattern and/or color combination is displayed. In another example, one ply may have portions where the ply is cut away or removed so that a pattern and/or color combination is present. The pattern and/or color combination may be representative of a sports team, a logo, a corporate advertisement, or a combination thereof. The cover may be any device that extends over an open area of the storage device so that unwanted materials are prevented from entering the storage device. The cover may have a length of about 40 cm or more, about 45 cm or more, or about 50 cm or more. The length of the cover may be between about 30 cm and 100 cm or preferably between about 40 cm and 60 cm. The cover may have a width of about 20 cm or more, about 25 cm or more, about 30 cm or more, or about 35 cm or more. The width of the cover may be between about 20 cm and 80 cm and preferably between about 25 cm and 55 cm. The cover may temporarily attach, permanently attach, or both to the storage device. Preferably, one side is permanently attached and one side temporarily attaches. The temporary attachments of the cover may attach to one or more external portions of the storage device. The temporary attachments of the cover may attach to the storage device using any mechanism that will provide some resistance to the cover being moved. The temporary attachments of the cover may be a fastener, a magnet, a hook and loop fastener, a grommet, a snap, a button, or a combination thereof. Preferably, a magnet is internally located in the cover between two opposing plies and another magnet is located with one or more of the walls of the storage device so that when the cover is closed the magnets assist in maintaining the cover in a closed position, open position, half-open position, or any position therebetween. The one or more temporary attachments may be located anywhere on the cover. Preferably, the temporary attachments are located at an end of the cover distal from the permanent attachment points (i.e., on the ends of the cover). The cover may include one or more exterior access ports.

The cover, back wall, front wall, side walls, or a combination thereof of may include one or more exterior access ports. The one or more exterior access ports may have any size and shape so that articles stored in the storage device may be removed from the storage device without opening the cover, loosening the tightening device, or both. The exterior access ports may allow articles to be stored between the two layers of the cover and/or another wall of the device. The exterior access ports may allow articles to be retrieved from the storage device without opening the cover. The one or more exterior access ports may be located anywhere along the storage device. Preferably, the one or more exterior access ports are located adjacent to and/or directly above the article holder portions so that the article holder portions may be directly accessed without opening the cover, unattaching the storage device from its storing position, or both. The one or more exterior access ports may be permanently open, closable, or both. The one or more exterior access ports may include a fastener so that when not in use they may be closed to prevent unwanted materials from entering, the article holder portion. The one or more exterior access ports may be closed by a fastener. Some fasteners that may be used include a zipper, a hook and loop fastener, buttons, magnets, or a combination thereof. The one or more exterior access ports may access an exterior storage compartment. An exterior storage compartment may be any size and shape so that articles may be stored and easily accessed without having to entry the main article holding portion. The one or more exterior access ports may allow for a user to access the article holder portion, be an exterior storage compartment, or both. The one or more exterior access ports may have a longest dimension of about 15 cm or more, about 20 cm or more, or about 25 cm or more. The one or more exterior access, ports may have a longest dimension of between about 10 cm and 50 cm, preferably between about 15 cm and 35 cm and more preferably between about 20 cm and about 30 cm. The cover may cover the article holder portion, one or more side holders, or a combination thereof.

The storage device may include a side holder on one or both sides of the article holder portion. The storage device may include one or more side holders. One or more sides of the storage device may include one or more side holders. For example, one side may include zero side holders and an adjacent side may include two side holders. The side holders may hold, beverages, straps, cameras, articles of clothing, food, all or a portion of the suspension portion, any item that a user desires to keep suspended off the ground and/or clean, or a combination thereof. The side holders include a volume. The volume of the article holding portion to the volume of the side holders may be about five times or more, about ten times or more, about 15 time or more, about 20 times or more, or about 50 times or more, about 70 times or less, or about 60 times or less than a volume of the side holder.

The side holder includes at least four walls connected together. In one example, the side holder includes a front wall, a rear wall, and first side wall connected to the front wall and the rear wall, and the front wall and the rear wall are connected to a second side wall so that the first side wall and the second side wall are on opposite sides of the front wall and the rear wall. The side holder includes a bottom wall connected to the front wall, the rear wall, the first side wall, and the second side wall forming the side holder so that contents are held in the storage device. The side holder and the article holding portion may be discrete parts. The side holder and the article holding portion may include common parts. The side holder may be attached to the article holding portion via sewing, a zipper, buttons, clips, hardware, fasteners, or a combination thereof so that the side holder may be permanent or detachable. Preferably, the side holder is permanently attached to the article holding portion so that the article holding portion and the side holder include a common wall. The side holder may be sufficiently large so that it holds articles such as drinks. The side holder may be generally top opening. The side holder may generally sit directly below a support structure. The side holder may be large enough so that the side holder holds containers. Preferably, the side holder may be large enough to hold containers in a vertical position so that the contents of the container do not fall out of or spill from the container.

The side holder is large enough so that the side holder holds a container (e.g. a cup, bottle, can, juice box, bladder (i.e. such as found in a hydration pack or juice pack), or a combination thereof) that holds contents with a volume of about 0.5 L or more, about 1.0 L or more, or even about 1.5 L or more. The side holder may be made of an expandable material. The side holder may be made of a material that may expand to a volume that is 1.2 times, 1.5 times, 2 times, 3 times, or even 4 times its unexpanded volume. The side holder may be a baggy material and include portions that are expandable. For example, at least one wall of the side holder may be a baggy material and the top of the baggy material may include an elastic cord so that after an article is placed in the side holder the elastic cord retracts and assists in securing the article. The side holder may include one or more ports so that moisture may exit the side holder so that the contents of the article holder portion remain free of moisture. All or a portion of the side holder may be a mesh netting. All or a portion of the side holder may be spandex or lycra. One or more of the holders may have a configuration so that a non-rigid cup may be placed in the side holder without the cup being deformed by the side holder. One or more of the holders may be designed to support a non-rigid cup so that the lid remains securely fastened to the cup while the cup is located in the side holder. The one or more holders may have any configuration so that a non-rigid cup is not deformed. Preferably, the one or more holders have a configuration so that a non-rigid, cup is securely held in place without being crushed, deformed, bent, compressed, or a combination thereof.

The side holder may have a crisscross configuration that supports the cup without deforming the cup. For example, a piece of material may extend from a first direction at an angle and another piece of material may extend from a second opposing direction at an angle so that the two pieces of material converge and cross. The crisscross configuration may generally form an "X." The crisscross configuration when viewed from a side may have a "V" configuration. The pieces of material forming the crisscross configuration may broaden along the length of the pieces of material. For example, each piece of material may have a thinner connection point at an upper region of a side holder and gradually become broader as the piece of material extends to a lower region proximate to the base of a non-rigid cup so that the base is well supported and the top of the cup has sufficient space so that the top region of the cup is free of compression, bending, deformation, crushing, or a combination thereof. The lower portion of each of piece of material may have a width that is 1.2 times, 1.5 times 2.0 times, 2.5 times, or 3.0 times or more the width of the upper portion. Each piece of material may be attached to the storage device at any location along a length of each piece of material. Preferably, each piece of material may be attached to the storage device at a top and a bottom so that the middle is free of a connection with the storage device. One or both pieces of material may be attached to the storage device along an upper region of each piece of material and the bottom and middle regions may be free of attachment to the storage device. The non-rigid cup may be a Styrofoam cup, a paper cup, a wax coated paper cup, a plastic cup, a lidded cup, or a combination thereof. Preferably, the non-rigid cup is a lidded cup and, when the cup is placed into the side holder with the crisscross configuration the cup is not compressed and the lid remains attached to and covering the cup. The side holder with the crisscross configuration may have a base portion supported by the opposing pieces of material. The base portion may be supported on opposing sides by separate, angled pieces of material that attach to the base portion from opposing directions. When an article is placed on the base portion the base portion may be rigid and form a planar support. The base portion, when an article is placed on the base portion may deflect so that the two opposing pieces of material are pulled towards each other supporting the sides of the article without applying enough force that the article is compressed, deformed, bent, crushed, or a combination thereof.

The side holder, the article holder portion, or both may include a tightener. The tightener may be any device that allows all or a portion of the side holder, the article holder potion, or both to be compressed, bunched, pulled in, or a combination thereof so that an opening of the side holder, the article holder portion, or both is reduced and/or closed. The tightener may be elastic, rigid, deformable, stretchable, or a combination thereof. The tightener may assist in securing components in the side holder, the article holder portion or both. The tightener may be located in a top region of the side holder, the article holder portion, or both. The tightener may be located along and/or within a top edge of the side holder, the article holder portion, or both. The tightener may be an elastic cord. Preferably, the tightener may be an elastic cord with a cross-sectional length of between about 0.1 mm and about 0.5 mm (i.e., a diameter of about ⅛ in). The tightener may be any length so that the tightener substantially spans the perimeter of the side holder, the article holder portion, or both and assists in closing and/or securing articles in the respective holder. The tightener may include a securing device. The tightener may include a securing device so that as an opening of the side holder, the article holder portion, or both is reduced the securing device may maintain the reduced size of the opening so that articles may be held in place, the contents may be covered, or both. The securing device may be any device that holds the tightener in place. The securing device may be spring loaded. The securing device may be deformable. The securing device may hold ends and/or sections of the tightener so that when tightener is used to close a side holder, an article holder portion or both the shape is size is substantially maintained. The tightener may be any length and size so that the tightener may be located around the perimeter of the side holder, the article holder portion, or both. The tightener may extend around two sides or more of the side holder, the article holder portion, or both. The tightener may extend around three sides or more of the side holder, the article holder portion, or both. Preferably, the tightener attaches to sides of one wall and extends around three walls so that the side holder, the article holder portion, or both may be closed. The tightener in the side holder may have a length of about 12 cm or more, about 15 cm or more, about 20 cm or more. The tightener in the side holder may have a length of between about 10 cm and 30 cm and preferably between about 15 cm and 25 cm. The tightener in the article holder portion may have a length of about 60 cm or more, about 75 cm or more, or about 90 cm or more. The tightener in the article holder portion may have a length of between about 50 cm and 300 cm, preferably about 60 cm and 200 cm or more preferably between about 80 cm and about 125 cm. The tightener may be one continuous piece without ends. The tightener may include two ends. The tightener may extend around all or a portion of an upper edge of the article holder portion and ends and/or part of the tightener may extend out from any wall (e.g., front wall, back wall, right wall, left wall, or a combination thereof) of the article holder so that the tightener may be tightened.

Preferably, the tightener extends out of a front wall. More preferably, the tightener extends out of two eyelets in the front wall so that the tightener may be used to tighten. The eyelets may be made of any material and be of any shape and size so that the tightener may be used to tighten the side holder, the article holder portion, or both. The eyelets may be fabric, plastic, rubber, metal, or a combination thereof. The front wall may include one or more fasteners below the tightener so that the cover may conceal the tightener. The one or more fasteners may be any fastener discussed herein for securing the cover in place. Preferably, the one or more fasteners are magnets that may be secured to the opposing magnets and/or magnetic material of the cover.

The storage device includes a suspension portion. The suspension portion is connected to the article holding portion so that the storage device can be removably attached a support structure. The suspension portion may include one or more straps. The one or more straps may be located at any location along the storage device so that the one or more straps may assist in carrying the storage device, attaching the storage device to a support structure, or both. The one or more straps may be a single strap that extends from a first side of the storage device to a second side of the storage device. The one or more straps may extend from front to back, from one side to the opposing side, from a first side on the front to a second side on the rear so that the strap is diagonally attached to the storage device, or a combination thereof. The one or more straps may be used as shoulder straps so that the storage device may be used as a backpack, a messenger bag, a shoulder bag, a handbag, or a combination thereof. The one or more straps may be one continuous piece without breaks and/or detachable features. Preferably, the one or more straps may be one continuous piece and may include breaks and/or detachable features. The one or more straps may connect the storage device to a support structure. The storage device may include one or more fasteners so that the one or more straps may connect the storage device to a support structure. The one or more fasteners may be located at any location on the storage device so that the storage device may be connected to a support structure. For example, the storage device may include one strap that is attached at both ends to the front side of the storage device and two fasteners on the back side of the storage device so that the straps extend over the support structure and attach to the fasteners that extend under the support structure so that the storage device hangs below the support structure. The one or more straps may be a single strap that includes a detachment feature so that the single strap may be separated into two or more straps that are used to connect the storage device to a support structure. The detachment feature may be any feature that is detachable so that the strap may be split into two or more parts and used to connect the storage device to a support structure. The detachment feature may be a hook and loop fastener; a carabiner; a releasable buckle (e.g., side release, front release, or both); a flat fastener with padding, a padded covering that connects, and fastens the two ends of the strap, the like, or a combination thereof.

The one or more straps may be a first strap and a second strap. The suspension portion includes a first strap and a second strap. The first strap may be attached to the article holder portion. The first strap may be attached to the front wall, the middle wall, the rear wall, or a combination thereof. Preferably, the first strap is attached to the rear wall and either the front wall or the middle wall. The first strap may be attached to the first side wall or the front wall at a location proximate to the first side wall. The second strap may be attached to the article holder portion. The second strap may be attached to and/or proximate to the front wall, the middle wall, the rear wall, the cover, or a combination thereof. Preferably, the second strap is attached to the rear wall and either the front wall or the middle wall. The second strap may be attached to the second side wall or the front wall at a location proximate to the second side wall. Preferably, the first strap and the second strap are on opposing sides of the storage device. The first strap and the second strap both include ends that form a connection so that the storage device attaches to the support structure. The one or more straps may have ends that completely encircle the support structure, extends over a portion of the support structure and hook to the support structure, hook to a hole in the support structure, hook to an opposing end of the suspension portion so that the connection, between the opposing ends hold the storage device on the support structure, hook to a fastener on the storage device, or a combination thereof. The suspension portion preferably lays flat along the support structure when the suspension portion is connected to the support structure. The suspension portion may be one continuous piece. The ends that form a connection preferably use a fastener to form the connection. The first strap and the second strap both include a fastener for connecting the storage device to a support structure. The fastener may be any fastener hardware that connects the storage device to the support structure. The fastener may be a buckle, clip, hook, hook and loop (e.g. Velcro), carbineer, male portion that is inserted into a female portion, snaps, buttons, a knot, the like or a combination thereof. The fastening hardware may be free of hook and loop. The fastening hardware may be made of any material so that the storage device may be attached to a support structure. The fastening hardware (e.g. attachment hardware) may be made of a molded plastic, metal, plastic, cloth, a textile, nylon, or a combination thereof. The fastening hardware may be free of molded plastic parts. The fastening hardware may be free of metal components. The fastener may be used on any other component of the storage device discussed herein such as the tethers to fasten and or adjust the length of the component. The straps may include attachment features so that items can be clipped on the straps and hand from the straps of the storage device. The straps may extend along a portion of the width of the article holder portion forming a tether.

The suspension portion may include a horizontal and/or vertical tether. The tether may be any device that limits forward movement of storage device. The tether may be attached to the rear wall, the front wall, the middle wall, or a combination thereof. The horizontal tether may be any device that limits outward length of the article into a walking path, out from under the support structure, into the back of legs, into the front of legs, or a combination thereof. Preferably, the tether is made of the same material as the straps. The tether may be free of a fastener. The tether preferably includes a fastener. The tether may also include a length shortening device. For example, the tether may include a length shortening device that allows the tether to extend to its maximum length and then the device reacts and the length of the tether is shortened so that the length is limited. The length shortening device may be any of the fasteners discussed herein. The length shortening device may be made of elastic, may be holes in the tether and the length is selected based upon which hole is hooked, the like, or a combination thereof. The one or more tethers may be used so that the storage device includes a retracted position (e.g. the front wall and/or middle wall is pulled back so that all or a majority of the storage device fits under the support structure). The storage device includes an unretracted position when the tethers are not used to restrain the front wall and/or middle wall. Thus, the front wall and middle wall when in the unretracted position may include an angle past vertical so that the articles in the storage device are easily accessible under the support structure. The storage device (i.e. front wall and/or middle wall) includes a vertical axis so that the article holding portion is accessible at an angle that is offset from the vertical axis by an angle of about 5 degrees or more, preferably about 10 degrees or more, more preferably about 15 degrees or more, even more preferably about 20 degrees or more, or most preferably about 25 degrees or more. The angle may be about 45 degrees or less, about 40 degrees or less, or about 35 degrees or less. The vertical tethers can be used to reduce the depth or height of the article holder portion. The vertical tethers may be used so that the storage device is free of contact with the ground. The vertical tethers may suspend the storage device about 1 cm or more, about 2 cm or more, about 5 cm or more, about 7 cm or more, or even about 10 cm or more above the ground. It is contemplated that the suspension portion may be reduced in length so that the storage device is elevated above the ground however, the vertical tethers may additionally be used to reduce the depth or height. The tethers may move the storage device away from a vertical portion of the support structure. The tethers may move the storage device about 1 cm or more, about 2 cm or more, about 5 cm or more, or about 7 cm or more away from a vertical portion of the support structure. The vertical tethers may also be used so that the storage device fits under the support structure.

The storage device includes a deployed state and a stored state. The device includes a deployed state that includes a deployed state volume for containing articles. In the deployed state the storage device may be drapeable. In the deployed state the material may elastically deform back to a previous state so that the device expands to a previous shape and volume with minimal user input (i.e. the user hands the storage device and its own weight substantially deploys the storage device). The deployed state volume may be about 10000 $cm^3$ be greeter, about 15,000 $cm^3$ or greater, about 20,000 $cm^3$ or greater, or even about 25,000 $cm^3$ or greater. The deployed state volume may be about 75,000 $cm^3$ or less, about 50,000 $cm^3$ or less, or about 30,000 $cm^3$ or less. The device collapses and packs into a packed state and includes a packed state volume.

The packed state volume is about 50 percent or less, about 40 percent or less, about 30 percent or less, preferably about 20 percent or less, or more preferably about 10 percent or less of the deployed state volume. The storage device when in the packed state can be placed into a pocket or a jacket or pants. The storage device has a volume in the packed state of about 50,000 $cm^3$ or less, preferably about 25,000 $cm^3$ or less, more preferably about 10,000 $cm^3$ or less, even more preferably about 5,000 $cm^3$ or less, or most preferably about 1,500 $cm^3$ or less. The storage device when in a packed state may have a volume of about 2000 $cm^3$ less, about 1200 $cm^3$ or less, or about 850 $cm^3$ or less. Volume as discussed herein is the amount of a fluid that the container can hold rather than the amount of space the container itself displaces. The storage device, when in the packed state, may be compact so that the storage device has a length of about 20 cm or less, about 18 cm or less, or about 15 cm or less; a width of about 15 cm or less, about 12 cm or less, about 10 cm or less, or about 8 cm or less; and a height of about 15 cm or less, about 12 cm or less, about 10 cm or less, or about 8 cm or less. The storage device may be compressed into the packed state without affecting the deployed state shape and/or volume. The storage device is drapeable so that once the storage device is attached to a support structure the storage device transitions from the packed state to an unpacked state.

The walls of the article holding portion and/or the side holders may include a semi-rigid or rigid material. A rigid material is generally not plastically deformable and within the material characteristics in the elastic range. For example, a rigid or semi-rigid material if compacted may be deformed and unable to deploy back to a previous deployment state (i.e. the rigid material may become broken or permanently deformed). The semi-rigid or rigid material may be elastically deformable so that the device may be compacted into a stored states and then spring into a deployed state and hold the article holding portion and/or side holders open. The semi-rigid or rigid material may be made of plastic, rubber, or both. The walls of the storage device may be free of a rigid material or a rigid backing structure. The walls of the article holding portion may include one or more holes. The walls of the article holding portion, the side holders, or both may include insulation. The storage device may be used as a bag or backpack in the deployed state so that items may be carried out of the event. The opening in the device may be temporarily covered and/or closed so that articles are held in the device. The storage device may include its own internal pouch into which the storage device is compressed and packed.

The storage device may include a method. The method of use may include packing the device into a packed state. The method may include deploying the device. The device may be connected to a support structure. The device may be disconnected from the support structure. Articles can be placed in the article holding portion, the side holder, or both. The device may be converted into a bag or backpack while the articles are still in the device without losing the articles.

FIG. 1 illustrates one possible storage device 2 as taught herein. The storage device 2 as show is in a deployed state 70. The storage device 2 is attached to a support structure 4 via a suspension portion 50. The suspension portion 50 includes a first strap 52 and a second strap 54. The first strap 52 and the second strap 54 extend along the top of the storage device forming a tether 58. The first strap 52 and the second strap 54 include a fastener 56 for attaching the storage device 2 to the support structure 4. The storage device includes an article holder 10 and a side holder 30 on both sides of the storage device 2. The article holder 10 includes a front wall 12, a middle wall 16, a first side wall 18, a second side wall 20, and a bottom wall 22 so that the article holder 10 holds articles. The side holders 30 includes a front wall 32, a rear wall 34, a first side wall 36, a second side wall 38, and a bottom wall 40. As illustrated the side holder 30 and the article holder 10 have one wall in common. As illustrated, the suspension portion 50 includes a second configuration and attaches to the middle wall 16 instead of the front wall 12 of the article holder 10. The first strap 52' and the second strap 54' attach to the middle wall 16 and include an tether 58' that spans between the middle wall 16 and the front wall 12. The first strap 52, 52' and the second strap 54, 54' include a fastener 56 for attaching the storage device 2 to the support structure 4. The tethers 58, 58' include a fastener 56 so that the tethers 58, 58' are adjustable so that the front wall 12 may be moved towards and away from the middle wall 16 into and out of the walking path 8.

Figure 2:
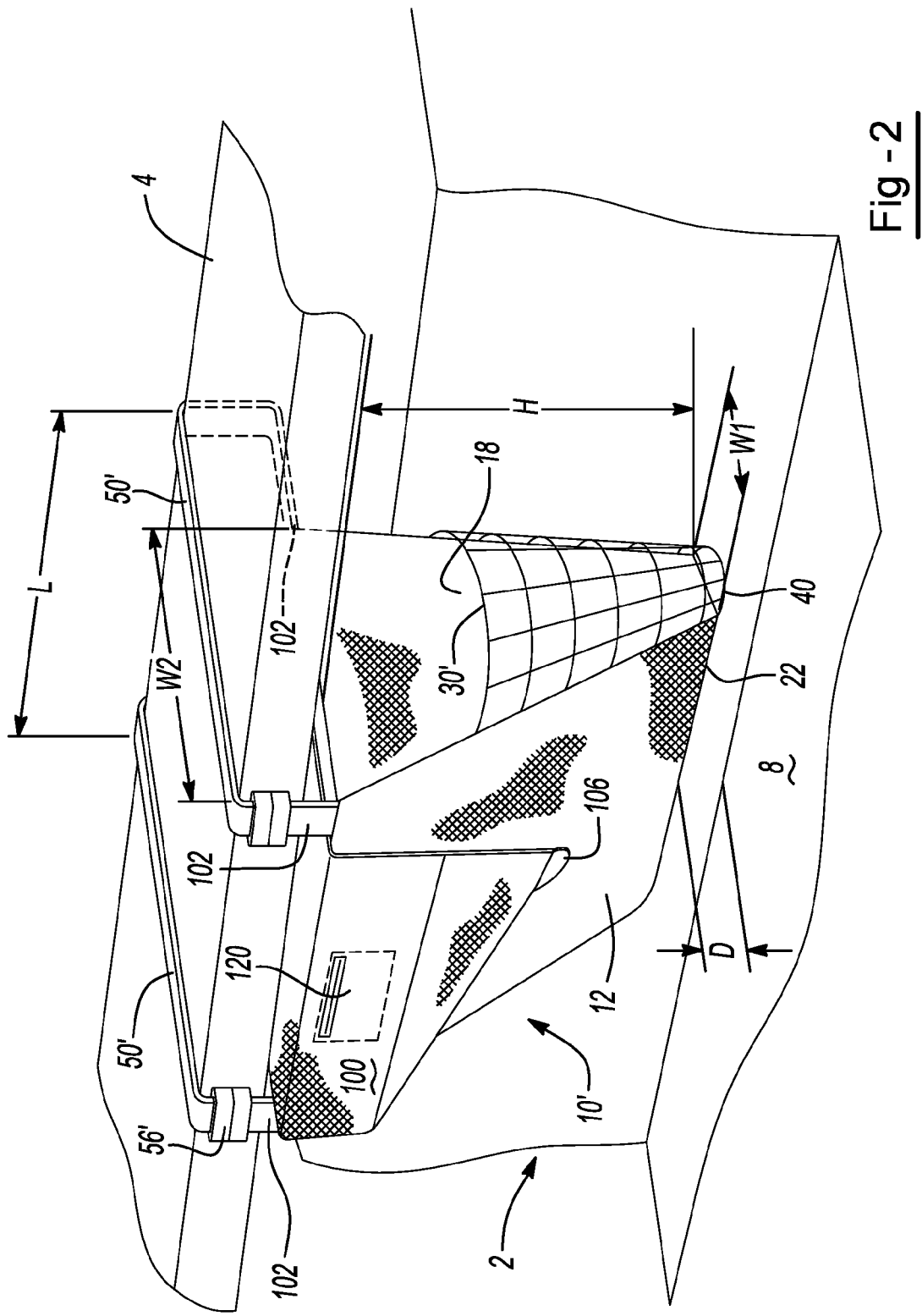
FIG. 2 illustrates another example of a storage device of the teachings herein in a deployed state.

FIG. 2 illustrates the suspension portion 50' of the storage device 2 attached to the support structure 4 and elevating the bottom walls 22 and 40 a distance (D) above the ground 8 so that the storage device 2 and its contents remain clean and dry. The suspension portion 50' attaches to the storage device at strap attachment points 102 so that the suspension portion 50' does not inhibit closing of the cover 100' over the article holder 10' The cover 100' includes an exterior storage compartment 120 so that high use items may be stored and/or retrieved without opening the cover 100' or moving the storage device 2. The cover 100' also includes a fastener 106 along an end region of the cover that assists in maintaining the cover in the closed position along the front wall 12. The storage device 2 includes a side holder 30' attached to a first side wall 18. As illustrated the side holder 30' is one continuous piece and has a mesh configuration. The storage device 2 has a length (L), a height (H), an upper width (W2), and a lower width (W1).

FIG. 3A illustrates the storage device 2 in a carrying state 60. The storage device includes a suspension portion 50" that only includes a first strap 52 that includes a detachment feature 62. The suspension portion 50" is connected to the storage device 2 at attachment points 102 on the storage device.

The suspension portion 50" includes a first strap 52' having a detachment feature 62 so that the first strap 52 when separated via the detachment feature 62 can connect to the front wall 12 using the first strap 52' and its detachment feature 62 so that the storage device 2 is connected to a support structure 4 (not shown). The article holder 10" is covered by a cover 100" having an exterior access port 104 so that a user can reach through the cover 100" using the exterior access port 104 without having to open the cover 100".

Figure 3B:
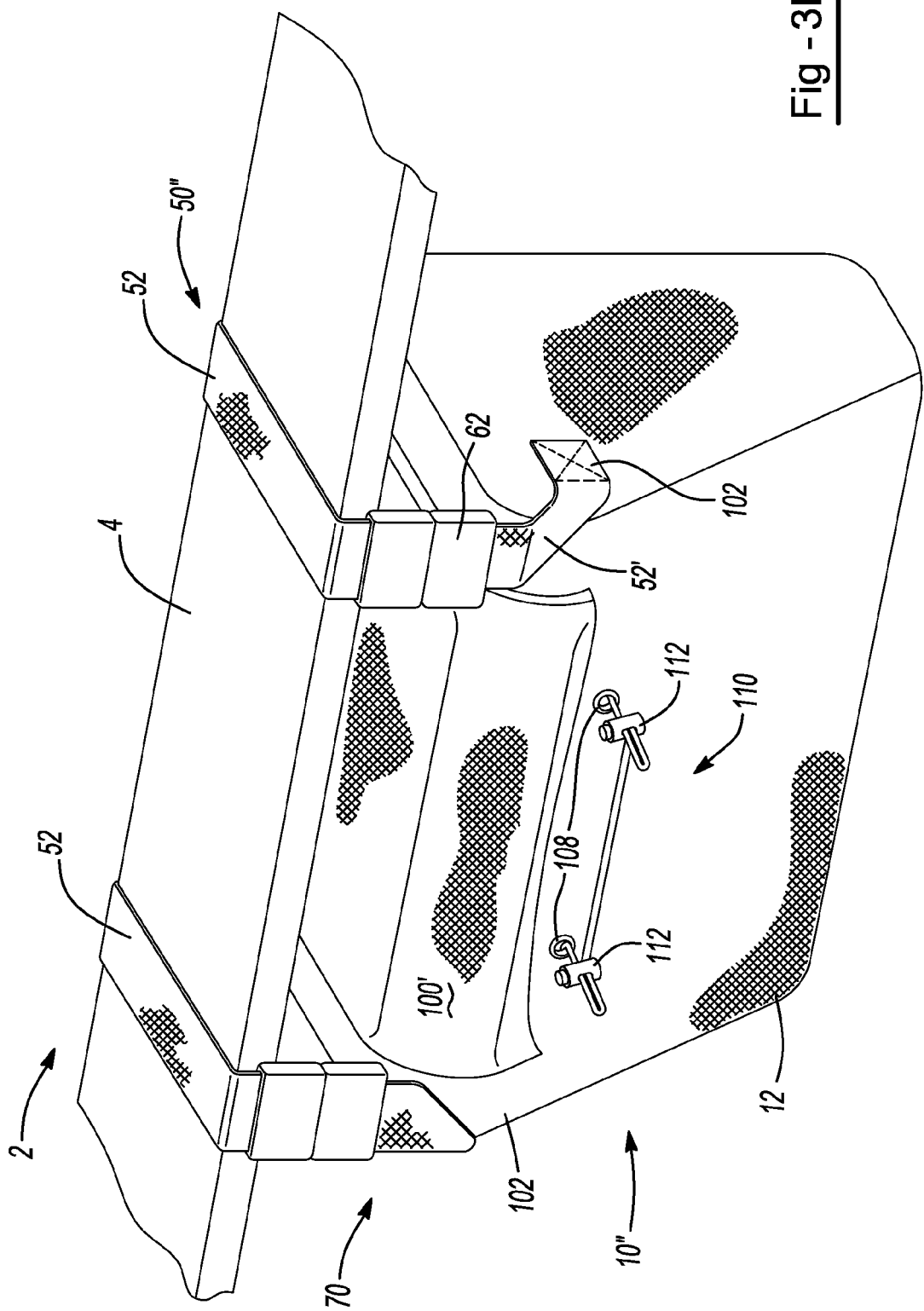
FIG. 3B illustrates the storage device of FIG. 3A in the deployed state.

FIG. 3B illustrates the storage device 2 in a deployed state 70. In the deployed state 70 the first strap 52 of the suspension portion 50" is separated into two pieces by disconnecting the detachment feature 62 of the first strap 52 so that each respective portion of the first strap 52 can connect to another first strap 52' connected to the front 12 of the article holder 10 at an attachment point 102. The first straps 52 when separated extend around a support structure 4 and connect to the another first straps 52' so that the storage device 2 is suspended from the support structure 4. As illustrated the cover 100" is cut away so that the tightener 110 is exposed. The tightener 110 extends out of eyelets 108 in the front wall 12. Securing devices 112 connect to the tightener 110 so that when the tightener 110 is pulled tight to close the article holder 10 or to pull the article holder back from a walking path 8 (not shown) the tightener 110 remains in tension and retracted.

Figure 3C:
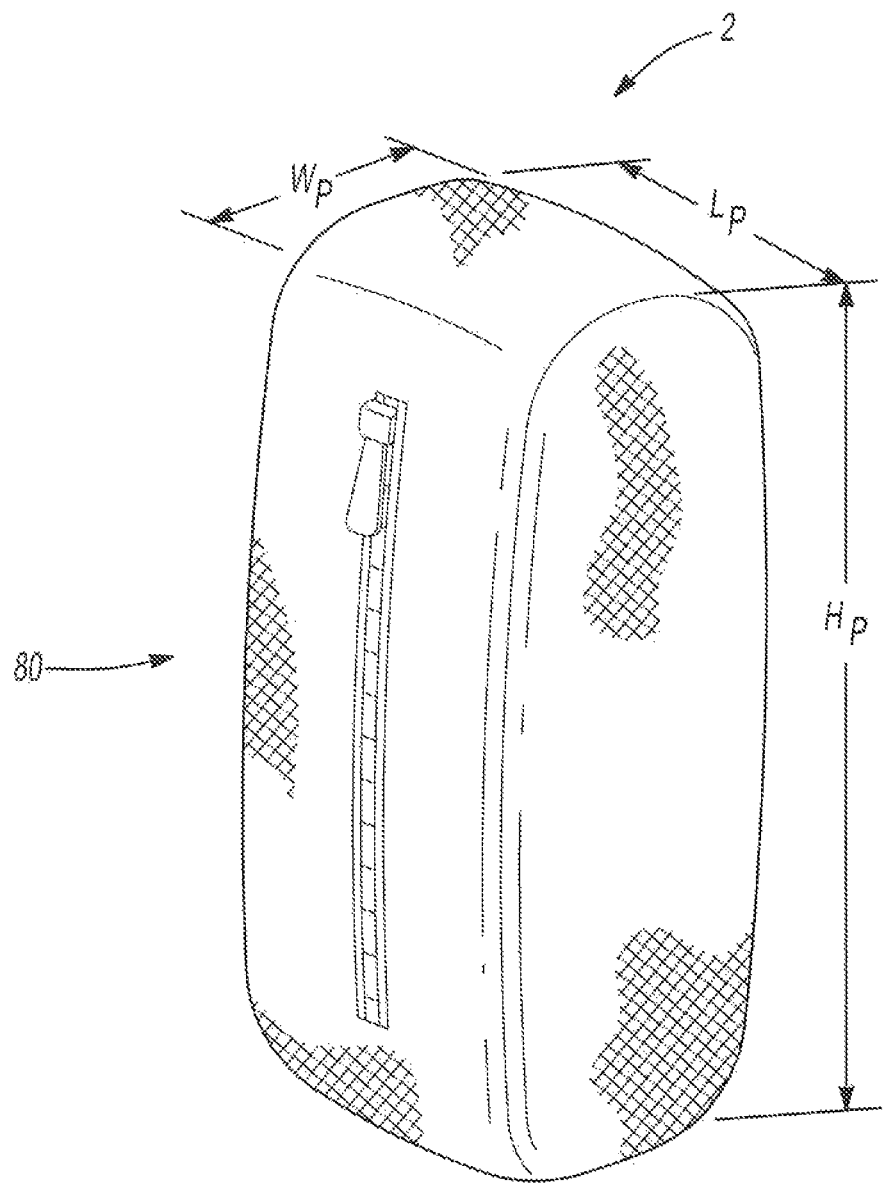
FIG. 3C illustrates the storage device of FIGS. 3A-3B in a stored state.

FIG. 3C illustrates a possible packed state, 80 of the storage device 2. The packed state 80 includes a length ($L_P$), width ($W_P$), and a height ($H_P$).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist, consist of, or consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A portable, packable, reusable storage device for attachment to a support structure comprising:
   a. an article holding portion comprising:
      i. a front wall;
      ii. a rear wall;
      iii. a first side wall connecting a first side of the front wall to a first side of the rear wall;
      iv. a second side wall connecting a second side of the front wall to a second side of the rear wall;
      v. a bottom wall connected to and extending between a bottom side of the front wall, a bottom side of the rear wall, a bottom side of the first side wall, and a bottom side of the second side wall,
      vi. the front wall, rear wall, first and second side walls, and bottom wall forming an enclosure, and a top of each of the front wall, rear wall, first wall, and second wall defining an opening of the enclosure; and
      vii. a cover extending over at least the opening of the enclosure of the article holding portion;
   b. side holders connected to and extending laterally outward from the first side wall and the second side wall of the article holding portion so that each of the side holders has a recess with a volume and the recess is configured to receive an article;
   c. attachment points on the top of the front wall and attachment points on the top of the rear wall, wherein the attachment points on the front wall include a detachment feature;
   d. a suspension portion connected with the article holding portion by the detachment features so that the suspension portion removably attaches the storage device to a seat portion of the support structure, the suspension portion including two or more straps that each connect to the top of the front wall and the top of the rear wall of the article holding portion at the attachment points so that the article holding portion hangs substantially below the seat portion of the support structure;
   wherein the article holding portion opens in a direction generally towards the seat portion of the support structure when the article holding portion is connected to the support structure;
   wherein the side holders are generally top opening and the side holders sit directly below the support structure:
   wherein the device is configured to include a deployed state that includes a deployed state volume for containing articles and the device collapses and packs into a packed state and includes a packed state volume that is about 30 percent or less of the deployed state volume;

wherein the two or more straps include fasteners on the ends that form a connection with the detachment features of the attachment points on the front wall of the article holding portion so that the storage device attaches to the support structure and so that the two or more straps can be wrapped around and connected to the support structure and can be connected together to form a single strap;

wherein the attachment points are located on the front wall so that the two or more straps do not inhibit opening and closing of the cover over the article holding portion; and wherein the two or more straps are used as shoulder straps so that the storage device is a backpack, messenger bag, shoulder bag, handbag, or a combination thereof.

2. The storage device of claim 1, wherein the suspension portions wrap around the support structure and the suspension portion lays flat along the support structure when the suspension portion is connected to the support structure.

3. The storage device of claim 1, wherein the suspension portion includes a tether, a tightener, or both that is connected to a front wall the article holding portion for limiting forward movement of the front wall so that the tether, the tightener, or both and the front wall limit outward movement of an article that is located within the article holding portion.

4. The storage device of claim 1, wherein the storage device when in the packed state can be placed into a pocket with a volume of about 15,000 cm³ or less.

5. The storage device of claim 1, wherein the storage device, when in the packed state, is compact so that the storage device has a length of about 20 cm or less, a width of about 15 cm or less, and a height of about 15 cm or less.

6. The storage device of claim 1, wherein the storage device when in a packed state has a volume of about 2,000 cm³ or less.

7. The storage device of claim 6, wherein the front wall forms an angle relative to the rear wall so that the front wall angles away from the rear wall.

8. The storage device of claim 7, wherein the angle of the front wall is offset from the rear wall and a vertical axis by about 5 degrees or more and about 45 degrees or less so that when in the deployed state the article holding portion is accessible.

9. The storage device of claim 1, wherein the side holders are large enough so that the side holders have a volume of about 0.5 L or more.

10. The storage device of claim 9, wherein the storage device is made of a woven or non-woven, synthetic, natural, post-consumer recycled, virgin, or a combination thereof textile, and wherein the material of the storage device can be screen printed, embroidered, painted, bedazzled, customized, or a combination thereof.

11. The storage device of claim 1, wherein the straps include attachment features so that items can be dipped on the straps and hang from the storage device.

12. The storage device of claim 1, wherein the storage device includes a depth or height and the article holding portion includes a depth or a height and the depth or the height of the article holding portion is adjustable via a vertical tether that moves a bottom wall of the article holding portion up and down so that the depth or the height of the article holding portion is reduced and the storage device fits under a seat without the bottom of the article holding portion touching the ground below the seat.

13. The storage device of claim 1, wherein the device is free of a rigid backing structure, and the cover is attached to one or more walls of the storage device.

14. The storage device of claim 13, wherein the storage device includes one or more exterior access ports so that the contents of the article holder can be accessed without having to open the storage device, opening the cover, or both.

15. The storage device of claim 1, wherein the storage device includes a packed state volume that is about 10 percent or less of the deployed state volume.

16. The storage device of claim 13, wherein the cover includes an exterior storage compartment.

17. The storage device of claim 1, wherein the side holders are attached to the first side wall and the second side wall of the article holding portion so that the side holders and the article holding portion include a common wall, and all or a portion of the side holder is a mesh netting.

18. The storage device of claim 17, wherein a top of the side holders include an elastic cord so that after an article is placed in the side holders the elastic cord retracts and assists in securing the article.

19. The storage device of claim 16, wherein the cover includes a side that temporarily attaches to the storage device and the temporary attachment is made using a fastener, a magnet, a grommet, a snap, a button, or a combination thereof.

* * * * *